(12) United States Patent
Kitamura et al.

(10) Patent No.: US 10,904,609 B2
(45) Date of Patent: Jan. 26, 2021

(54) DISPLAY CONTROL DEVICE AND DISPLAY CONTROL METHOD

(71) Applicant: Seiko Instruments Inc., Chiba (JP)

(72) Inventors: Yoshio Kitamura, Chiba (JP); Tomoki Ogura, Chiba (JP); Daisuke Yoshida, Chiba (JP); Yuichi Yoshigi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/703,283

(22) Filed: Dec. 4, 2019

(65) Prior Publication Data

US 2020/0186868 A1 Jun. 11, 2020

(30) Foreign Application Priority Data

Dec. 11, 2018 (JP) .................................. 2018-231683

(51) Int. Cl.
*H04N 21/431* (2011.01)
*G06Q 20/20* (2012.01)
(Continued)

(52) U.S. Cl.
CPC ....... *H04N 21/4316* (2013.01); *G06Q 20/201* (2013.01); *H04N 21/4722* (2013.01); *H04N 21/47815* (2013.01)

(58) Field of Classification Search
CPC ........ G06F 3/14; G06Q 20/20; G06Q 20/201; G07G 1/01; G07G 1/12; G09G 5/377;
(Continued)

(56) References Cited

U.S. PATENT DOCUMENTS 5,802,259 A 9/1998 Sugai
6,556,216 B1 4/2003 Cato et al.
(Continued)

FOREIGN PATENT DOCUMENTS

JP 2014-195877 A 10/2014

OTHER PUBLICATIONS

Extended European Search Report in Europe Application No. 19215209.8, dated May 12, 2020, 12 pages.

*Primary Examiner* — Stacy Khoo
(74) *Attorney, Agent, or Firm* — Brinks Gilson & Lione (57) ABSTRACT

A display control device includes a storage configured to store invariant image data serving as a source of displaying an invariant portion of a display image to be displayed on a display; a data receiver configured to receive format designation data for designating a format of the display image and original data for generating variable image data serving as a source of displaying a variable portion of the display image; a variable image data generator configured to generate the variable image data from the original data; a buffer configured to store the invariant image data and the variable image data; an image data storage configured to select the invariant image data from the storage based on the format designation data to store the invariant image data in the buffer, and store, in the buffer, the variable image data generated by the variable image data generator; and a display controller configured to execute display processing for causing the display to display the display image based on the invariant image data stored in the buffer and the variable image data stored in the buffer.

9 Claims, 7 Drawing Sheets

(51) Int. Cl.
*H04N 21/4722* (2011.01)
*H04N 21/478* (2011.01)

(58) Field of Classification Search
CPC ...... G09G 5/397; G09G 5/40; G09G 2340/12; G09G 2360/18; G09G 2370/04; H04N 21/4316; H04N 21/4722; H04N 21/47815
See application file for complete search history.

(56) References Cited

U.S. PATENT DOCUMENTS

| | | |
|---|---|---|
| 10,788,946 B2 * | 9/2020 | Oh .......................... G06F 3/048 |
| 10,791,298 B2 * | 9/2020 | Rutler ...................... H04N 5/45 |
| 2005/0174314 A1 | 8/2005 | Furihata et al. |
| 2006/0053233 A1 | 3/2006 | Lin et al. |
| 2007/0288584 A1 | 12/2007 | Tsai et al. |
| 2015/0138237 A1 | 5/2015 | Ghosh et al. |

\* cited by examiner

```xml
<?xml version="1.0" encoding="shift_jis"?>
<templete>
        <frame pos="0,0" size="480,220" scroll="up" line-height="55">
                <text width="160" align="left">ID_0</text>
                <text width="160" align="right">ID_1</text>
                <br />
        </frame>
        <frame pos="0,220" size="480,62">
                <text width="160" align="center">"SUBTOTAL AMOUNT"</text>
                <text width="160" align="right">ID_2</text>
                <br />
        </frame>
</templete>
```

```
<?xml version="1.0" encoding="shift_jis"?>
<template>
        <frame pos="0,0" size="480,272">
                <img align="center">img_1</img>
        </frame>
        <frame pos="0,60" size="480,212">
                <text width="240" align="center">"TOTAL AMOUNT"</text>
                <text width="240" align="right">ID_0</text>
                <br />
                <text width="240" align="center">"AMOUNT OF CASH RECEIVED"</text>
                <text width="240" align="right">ID_1</text>
                <br />
                <text width="240" align="center">"CHANGE"</text>
                <text width="240" align="right">ID_2</text>
                <br />
        </frame>
</template>
```

FIG.11

DISPLAY CONTROL DEVICE AND DISPLAY CONTROL METHOD

RELATED APPLICATIONS

This application claims priority to Japanese Patent Application No. 2018-231683 filed on Dec. 11, 2018, the entire content of which is incorporated herein by reference.

BACKGROUND OF THE INVENTION

1. Field of the Invention

The present invention relates to a display control device and a display control method.

2. Description of the Related Art

Hitherto, a point-of-sales (POS) system including a printing apparatus has been utilized mainly in the retail industry. As this type of apparatus, for example, there is known a printing system including a printing apparatus and a display.

Currently, the display of the point-of-sale system is frequently used for the purpose of not only displaying characters but also displaying, for example, an advertisement, a coupon ticket, and a two-dimensional code in real time. Therefore, the point-of-sale system is required to include a line or an electronic circuit capable of achieving high speed communication so that a large amount of data can be transmitted to the display. However, the point-of-sale system including such a line or an electronic circuit may increase the manufacturing cost.

In view of such circumstances, in this type of technical field, there has been a demand for a display control device and a display control method, which achieve reduction in manufacturing cost while allowing an image having a large amount of data to be displayed on a display.

SUMMARY OF THE INVENTION

According to one embodiment of the present invention, there is provided a display control device, including a storage configured to store invariant image data serving as a source of displaying an invariant portion of a display image to be displayed on a display; a data receiver configured to receive format designation data for designating a format of the display image and original data for generating variable image data serving as a source of displaying a variable portion of the display image; a variable image data generator configured to generate the variable image data from the original data; a buffer configured to store the invariant image data and the variable image data; an image data storage configured to select the invariant image data from the storage based on the format designation data to store the invariant image data in the buffer, and store, in the buffer, the variable image data generated by the variable image data generator; and a display controller configured to execute display processing for causing the display to display the display image based on the invariant image data stored in the buffer and the variable image data stored in the buffer.

In the above-mentioned display control device according to the one embodiment, wherein the buffer includes a first buffer configured to store the invariant image data and a second buffer configured to store the variable image data.

In the above-mentioned display control device according to the one embodiment, wherein the variable image data generator is configured to generate the variable image data each time the data receiver receives the original data, wherein the image data storage is configured to store the variable image data in the buffer each time the variable image data generator generates the variable image data, and wherein the display controller is configured to execute the display processing each time the image data storage stores the variable image data in the buffer.

In the above-mentioned display control device according to the one embodiment, wherein the original data includes at least one of a character code and code data, wherein the invariant image data includes at least one of template image data and predefined character image data, and wherein the variable image data includes at least one of font image data and code image data.

In the above-mentioned display control device according to the one embodiment, wherein the data receiver is configured to receive the original data transmitted through a printing apparatus.

According to one embodiment of the present invention, there is provided a display control method, including receiving format designation data for designating a format of a display image to be displayed on a display and original data for generating variable image data serving as a source of displaying a variable portion of the display image; generating the variable image data from the original data; an image data storing step of selecting invariant image data, which is stored in a storage and serves as a source of displaying an invariant portion of the display image, to store the invariant image data in a buffer, and storing, in the buffer, the variable image data generated in the generating of the variable image data; and a display control step of executing display processing for causing the display to display the display image based on the invariant image data stored in the buffer and the variable image data stored in the buffer.

DETAILED DESCRIPTION OF THE PREFERRED EMBODIMENTS

Figure 1:
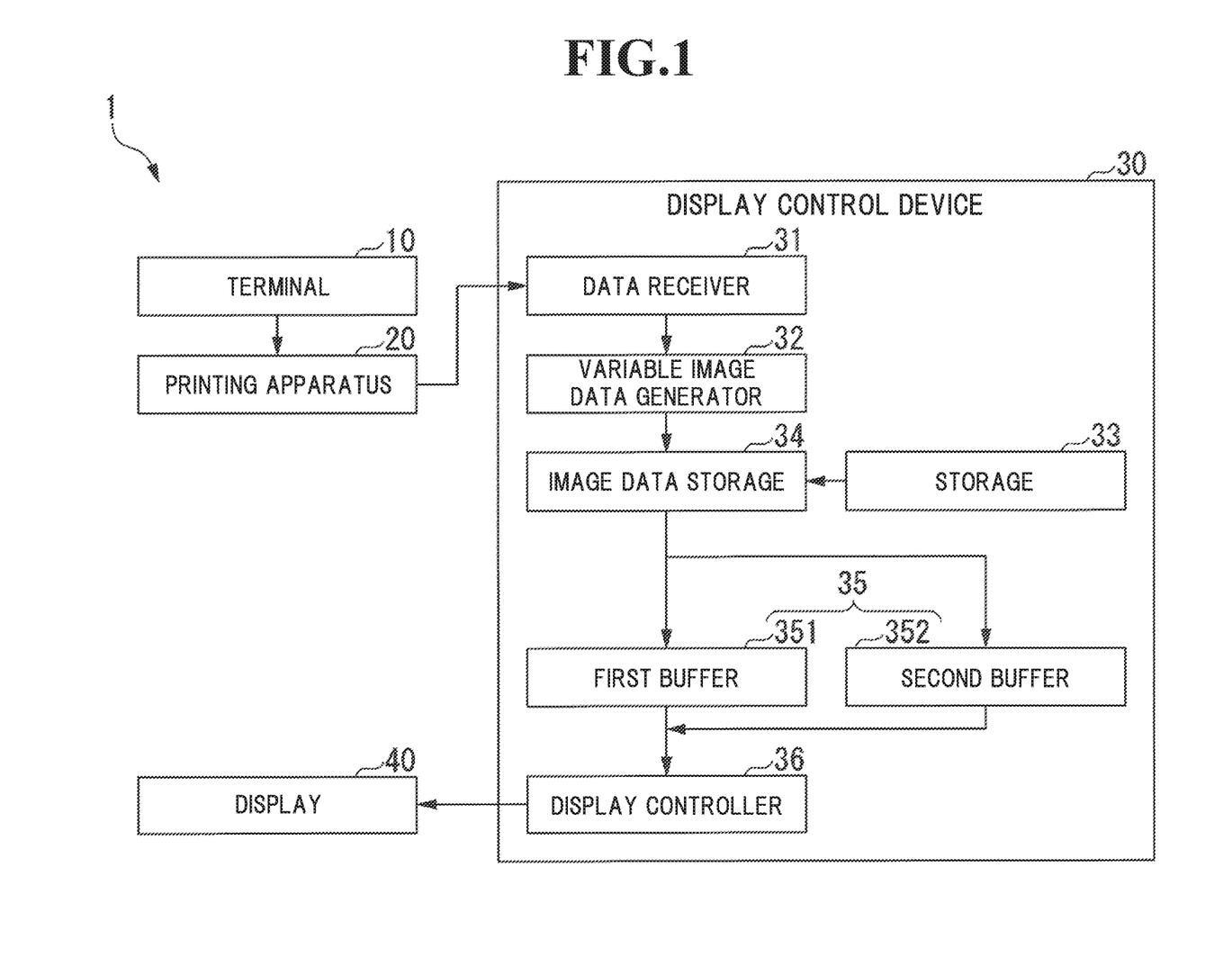
FIG. 1 is a diagram for illustrating an example of a configuration of a point-of-sale system in at least one embodiment of the present invention.

With reference to FIG. 1 to FIG. 6, a description is given of an example of a configuration of a point-of-sale system in at least one embodiment of the present invention by focusing on a display control device. FIG. 1 is a diagram for illustrating an example of the configuration of the point-of-sale system in at least one embodiment of the present invention. As illustrated in FIG. 1, the point-of-sale system 1 includes a terminal 10, a printing apparatus 20, a display control device 30, and a display 40.

The terminal 10 is, for example, a personal computer, a tablet, or a smartphone, and transmits data to the display control device 30 through the printing apparatus 20. The data to be transmitted to the display control device 30 by the terminal 10 is mainly original data described later, and may be a template image or a predefined character image, which are described later. The terminal 10 transmits such data to the printing apparatus 20 by wireless communication or wired communication. An example of the wireless communication to be executed between the terminal 10 and the printing apparatus 20 is Bluetooth (trademark). An example of the wired communication to be executed between the terminal 10 and the printing apparatus 20 includes communication using a universal serial bus (USB).

The printing apparatus 20 prints, for example, a receipt to be issued at the time of checkout processing at a retail store. In addition, the printing apparatus 20 transmits the data received from the terminal 10 to the display control device 30 by wired communication. An Example of the wired communication to be executed between the printing apparatus 20 and the display control device 30 includes communication using a USB.

As illustrated in FIG. 1, the display control device 30 includes a data receiver 31, a variable image data generator 32, a storage 33, an image data storage 34, a buffer 35, and a display controller 36.

The data receiver 31 receives format designation data and original data for generating variable image data. This original data is transmitted to the data receiver 31 through, for example, the printing apparatus 20. The format designation data is data for designating the format of a display image, for example, the layout and the design of the display image to be displayed on the display 40, and is associated with template image data and predefined character image data, which are described later.

The variable image data is data serving as the source of displaying a variable portion of the display image to be displayed on the display 40, for example, the name or price of a product purchased by a customer when the checkout processing is performed at the retail store, and includes at least one of font image data and code image data. The font image data is data serving as the source of displaying images of characters, numbers, or symbols themselves, and includes, for example, data serving as the source of displaying images of Mincho characters, numbers, and symbols. The code image data is data serving as the source of displaying an image of a code itself indicating a combination of specific characters, numbers, and symbols, and is, for example, data serving as the source of displaying a bar code or a two-dimensional code.

The original data includes at least one of a character code and code data. The character code is a combination of numbers and symbols associated with each character, for example, an ASCII code. The code data is data indicating numbers, characters, symbols, and other such information represented by a bar code or a two-dimensional code.

The variable image data generator 32 generates variable image data from the original data. Specifically, the variable image data generator 32 receives the original data from the data receiver 31, and acquires font image data associated with the original data from the storage 33 described later. In another case, the variable image data generator 32 receives the original data from the data receiver 31, and generates code image data associated with the original data.

The variable image data generator 32 may also generate variable image data each time the data receiver 31 receives the original data. This processing is performed when the display 40 is caused to execute scroll display. The scroll display referred to herein is, for example, a display mode of parallel moving a display position of the name and the price of a product that have already been displayed on the display 40 each time the bar code of the product purchased by the customer is read during the checkout processing at the retail store; and additionally displaying the name and the price of the product on the display 40.

The storage 33 stores invariant image data. The invariant image data is data serving as the source of displaying an invariant portion of the display image to be displayed on the display 40, for example, the background of a checkout screen to be displayed on the display 40 when checkout processing is performed at a retail store and characters, numbers, and symbols that continue to be displayed from the start to the end of the checkout processing. The invariant image data includes at least one of the template image data and the predefined character image data. The storage 33 is implemented by, for example, a read only memory (ROM). The template image data is data serving as the source of displaying the template image. The predefined character image data is data serving as the source of displaying the predefined character image.

Figure 2:
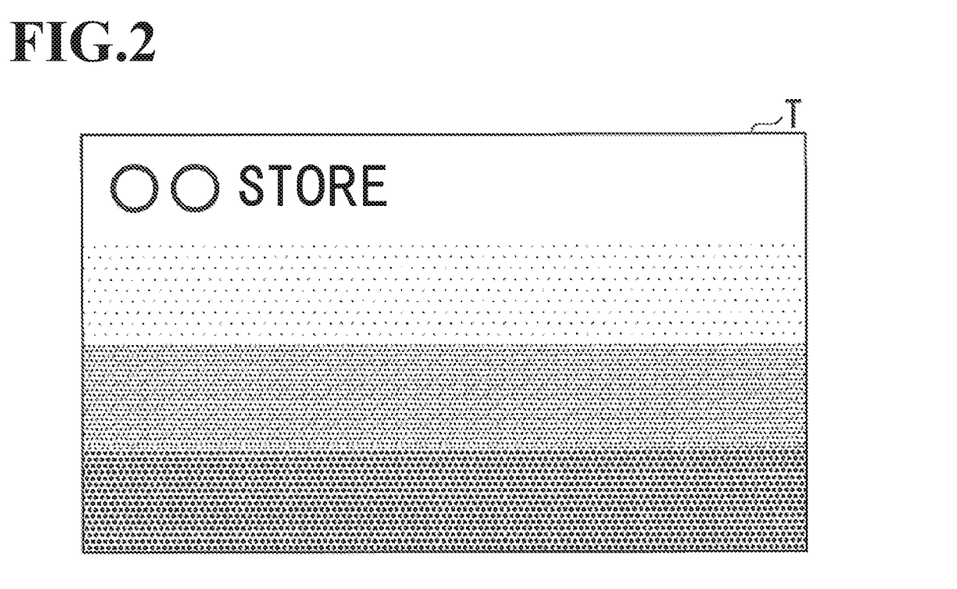
FIG. 2 is a diagram for illustrating an example of a template image in at least one embodiment of the present invention.

FIG. 2 is a diagram for illustrating an example of the template image in at least one embodiment of the present invention. A template image T illustrated in FIG. 2 visualizes a gradation serving as the background of the checkout screen to be displayed on the display 40 during the checkout processing and the character string "○○ STORE" that continues to be displayed during the checkout processing. The template image may be stored in the storage 33 when the point-of-sale system 1 is shipped, or may be registered afterward by a user to be stored in the storage 33.

Figure 3:
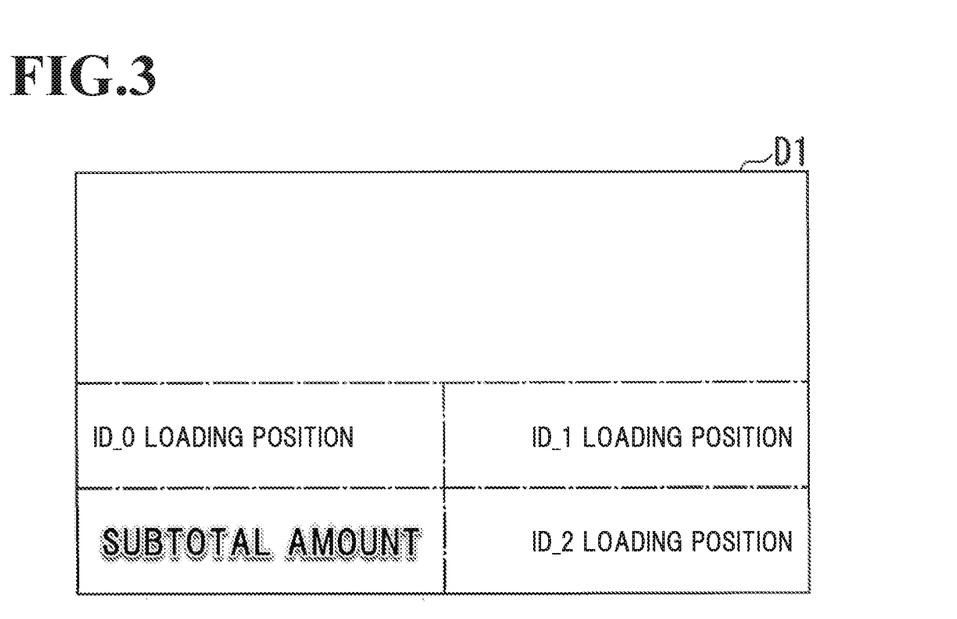
FIG. 3 is a diagram for illustrating an example of a predefined character image in at least one embodiment of the present invention.

FIG. 3 is a diagram for illustrating an example of the predefined character image in at least one embodiment of the present invention. A predefined character image D1 illustrated in FIG. 3 visualizes the character string "SUBTOTAL" to be displayed while the bar codes of the products purchased by the customer are sequentially read during the checkout processing. In addition, "ID_0 LOADING POSITION", "ID_1 LOADING POSITION", and "ID_2 LOADING POSITION" are illustrated in the predefined character image D1. "ID_0 LOADING POSITION" indicates a position at which the name of a product whose bar code has been read is to be displayed during specific checkout processing. "ID_1 LOADING POSITION" indicates a position at which the price of the product whose bar code has been read is to be displayed during the checkout processing. "ID_2 LOADING POSITION" indicates a position at which a subtotal amount of the prices of the products whose bar codes have been read so far is to be displayed during the checkout processing.

Figure 4:
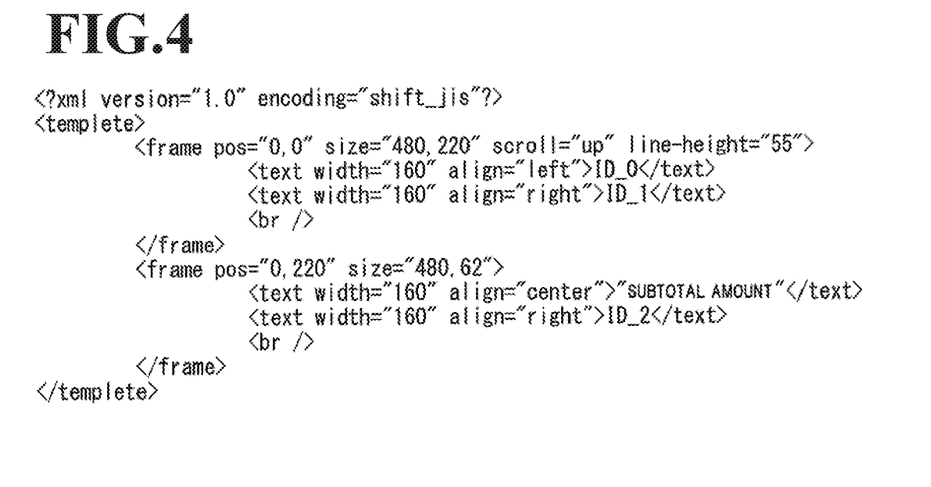
FIG. 4 is a diagram for illustrating an example of a case of using a markup language to define the layout of the predefined character image illustrated in FIG. 3.

FIG. 4 is a diagram for illustrating an example of a case of using a markup language to define the layout of the predefined character image illustrated in FIG. 3.

The layout of the character string "SUBTOTAL" illustrated in FIG. 3 is defined by the character string "<text width="160" align="center">SUBTOTAL</text>" on the ninth line from the top of FIG. 4. This character string defines that a field for displaying the character string "SUBTOTAL" has a horizontal width of 160, and that the character string "SUBTOTAL" is displayed at the horizontal center of the field.

The layout of "ID_0 LOADING POSITION" illustrated in FIG. 3 is defined by the character string "<text width="160" align="left">ID_0</text>" on the fourth line from the top of FIG. 4. This character string defines that a field for displaying the name of the product to be displayed at "ID_0 LOADING POSITION" has a horizontal width of 160, and that the name of the product is displayed left-aligned.

The layout of "ID_1 LOADING POSITION" illustrated in FIG. 3 is defined by the character string "<text width="160" align="right">ID_1</text>" on the fifth line from the top of FIG. 4. This character string defines that a field for displaying the price of the product to be displayed at "ID_1 LOADING POSITION" has a horizontal width of 160, and that the name of the product is displayed right-aligned.

The layout of "ID_2 LOADING POSITION" illustrated in FIG. 3 is defined by the character string "<text width="160" align="right">ID_2</text>" on the tenth line from the top of FIG. 4. This character string defines that a field for displaying the subtotal amount to be displayed at "ID_2 LOADING POSITION" has a horizontal width of 160, and that the name of the product is displayed right-aligned.

The predefined character image may be stored in the storage 33 when the point-of-sale system 1 is shipped, or may be registered afterward by the user to be stored in the storage 33.

The image data storage 34 selects invariant image data from the storage 33 based on the format designation data to store the invariant image data in the buffer 35, and stores, in the buffer 35, the variable image data generated by the variable image data generator 32. The image data storage 34 may also store the variable image data in the buffer 35 each time the variable image data generator 32 generates the variable image data. This processing is performed when the display 40 is caused to execute the above-mentioned scroll display.

The buffer 35 stores the invariant image data and the variable image data. Specifically, the buffer 35 includes a first buffer 351 configured to store the invariant image data and a second buffer 352 configured to store the variable image data. The first buffer 351 and the second buffer 352 are each implemented by a random access memory (RAM).

Figure 5:
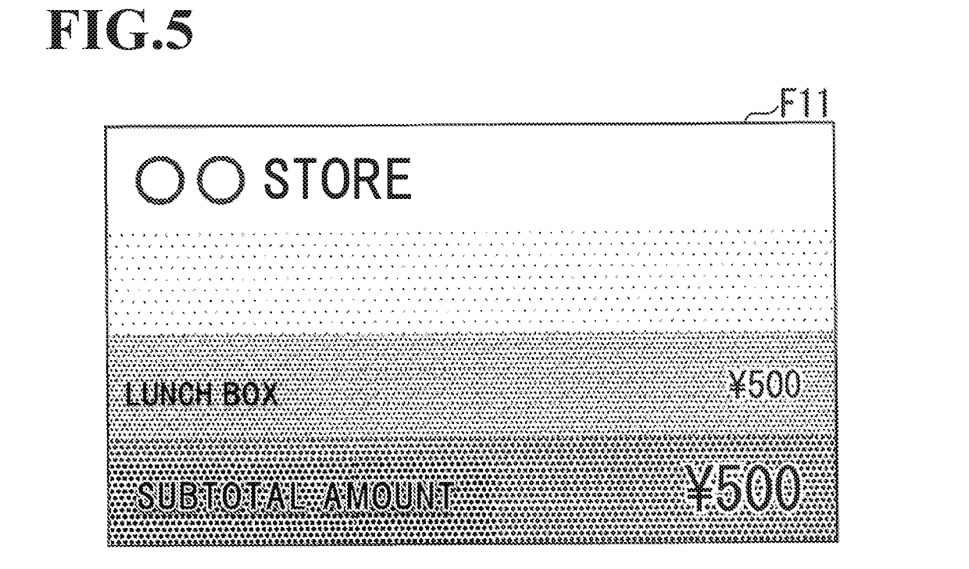
FIG. 5 is a diagram for illustrating an example of a display image in at least one embodiment of the present invention.
Figure 6:
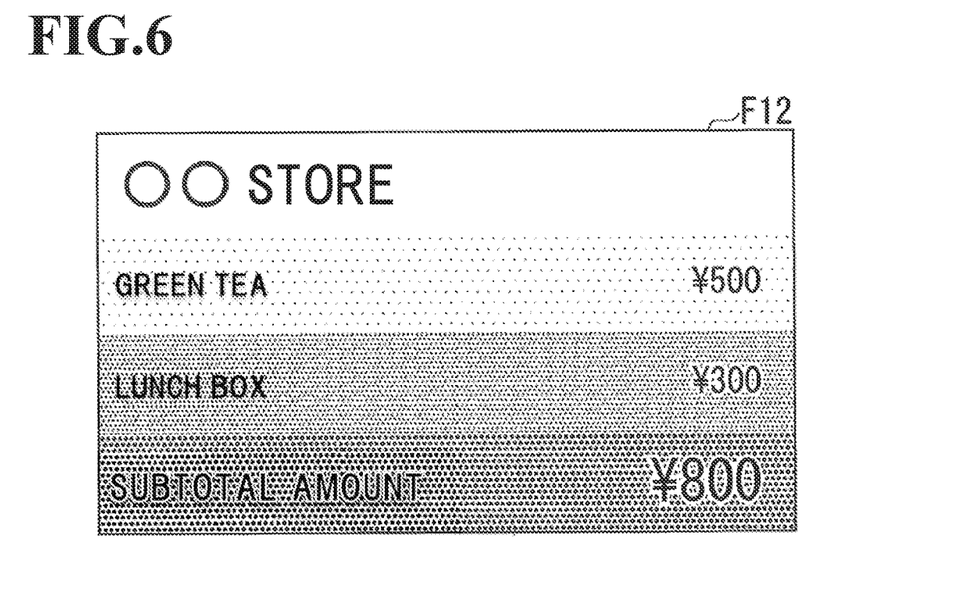
FIG. 6 is a diagram for illustrating an example of the display image in at least one embodiment of the present invention.

FIG. 5 and FIG. 6 are diagrams for illustrating examples of a display image in at least one embodiment of the present invention. The display controller 36 executes display processing for causing the display 40 to display a display image based on the invariant image data stored in the first buffer 351 and the variable image data stored in the second buffer 352.

For example, the display controller 36 executes the display processing for causing the display 40 to display a display image generated by compositing an image based on invariant image data and an image based on variable image data.

The image based on the invariant image data referred to herein is, for example, an image obtained by superimposing the template image T illustrated in FIG. 2 and the predefined character image D1 illustrated in FIG. 3 on each other.

The image based on the variable image data referred to herein includes, for example, an image of the characters "LUNCH BOX" indicating the name of a product, an image of the characters "500" indicating the price of the product, and an image of the characters "500" indicating the subtotal amount during the checkout processing. Those three images are composited in the predefined character image D1 at positions indicated by "ID_0 LOADING POSITION", "ID_1 LOADING POSITION", and "ID_2 LOADING POSITION", which are illustrated in FIG. 3.

With such processing, the display controller 36 generates a display image F11 illustrated in FIG. 5, and causes the display 40 to display the display image F11. As illustrated in FIG. 5, the display image F11 visualizes the characters "○○ STORE", the gradation serving as the background, the characters "SUBTOTAL" visualized in the predefined character image D1, the characters "LUNCH BOX", the characters "¥500" indicating the price of a lunch box being the product, and the characters "¥500" indicating the subtotal amount.

The display controller 36 may also execute the display processing described above each time the image data storage 34 stores the variable image data in the buffer 35. This processing is performed when the display 40 is caused to execute the above-mentioned scroll display.

Consideration is given to an exemplary case in which the font image data serving as the source of displaying the image of the characters "GREEN TEA" themselves of the name of a product purchased by the customer and the font image data serving as the source of displaying the image of the characters "¥300" themselves of the price of the product are stored in the second buffer 352 after the display 40 is caused to display the display image F11 illustrated in FIG. 5. In this case, the display controller 36 executes the display processing for displaying the display image F12 illustrated in FIG. 5 on the display 40. As illustrated in FIG. 6, in addition to the characters and other such information visualized in FIG. 5, the display image F11 visualizes the characters "GREEN TEA" and the characters "¥300" indicating the price of green tea being the product. In addition, the characters "LUNCH BOX" visualized in the display image F11 illustrated in FIG. 5 and the characters "¥500" indicating the price of the lunch box being the product are scrolled further upward in the display image F12 illustrated in FIG. 6. The display controller 36 further determines whether or not there is original data to be received. That is, the display controller 36 determines whether or not it is required to execute the scroll display again.

The display 40 is, for example, a high-definition color liquid crystal display (LCD), and displays not only characters but also an advertisement, a coupon ticket, a two-dimensional code, and the like in real time.

Figure 7:
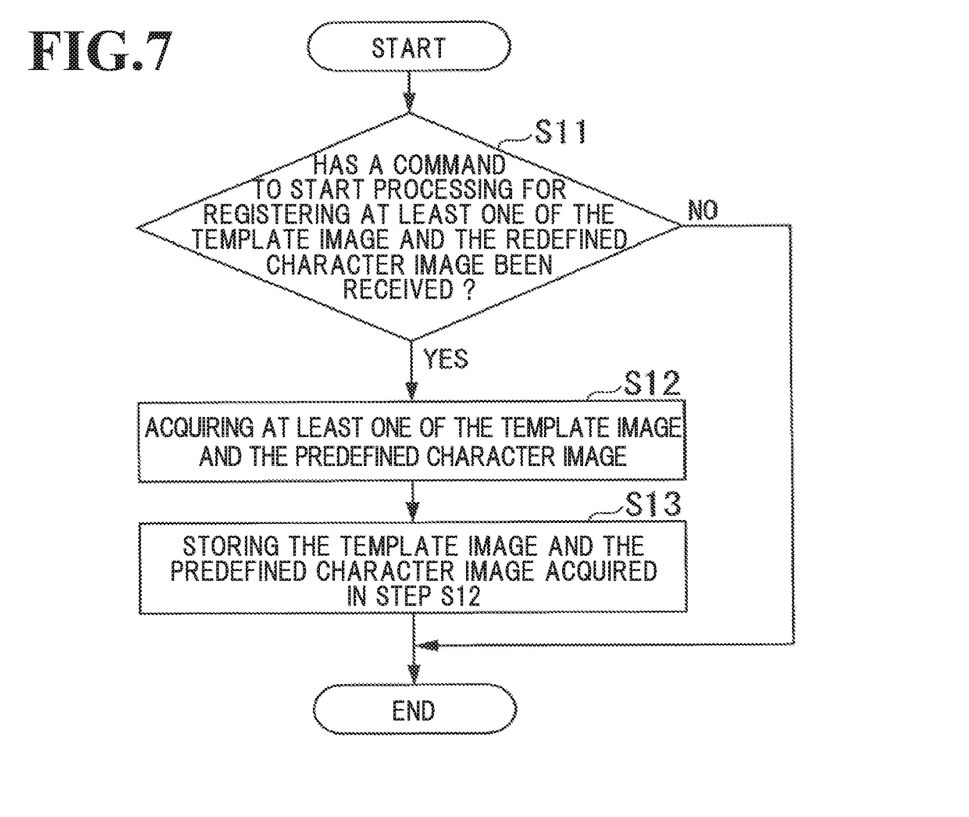
FIG. 7 is a flow chart for illustrating an example of processing to be executed by the display control device according to at least one embodiment of the present invention when the template image or the predefined character image is newly registered.

Next, with reference to FIG. 7, a description is given of an example of processing serving as executed by the display control device 30 when a template image or a predefined character image is newly registered. FIG. 7 is a flow chart for illustrating an example of processing to be executed by the display control device according to at least one embodiment of the present invention when the template image or the predefined character image is newly registered.

In Step S11, the display control device 30 determines whether or not a command to start processing for registering at least one of the template image and the predefined character image has been received. When determining that this command has been received ("YES" in Step S11), the display control device 30 advances the processing to Step S12, and when determining that this command has not been received ("NO" in Step S11), brings the processing to an end.

In Step S12, the display control device 30 acquires at least one of the template image and the predefined character image.

In Step S13, the display control device 30 stores, in the storage 33, the template image and the predefined character image acquired in Step S12.

Figure 8:
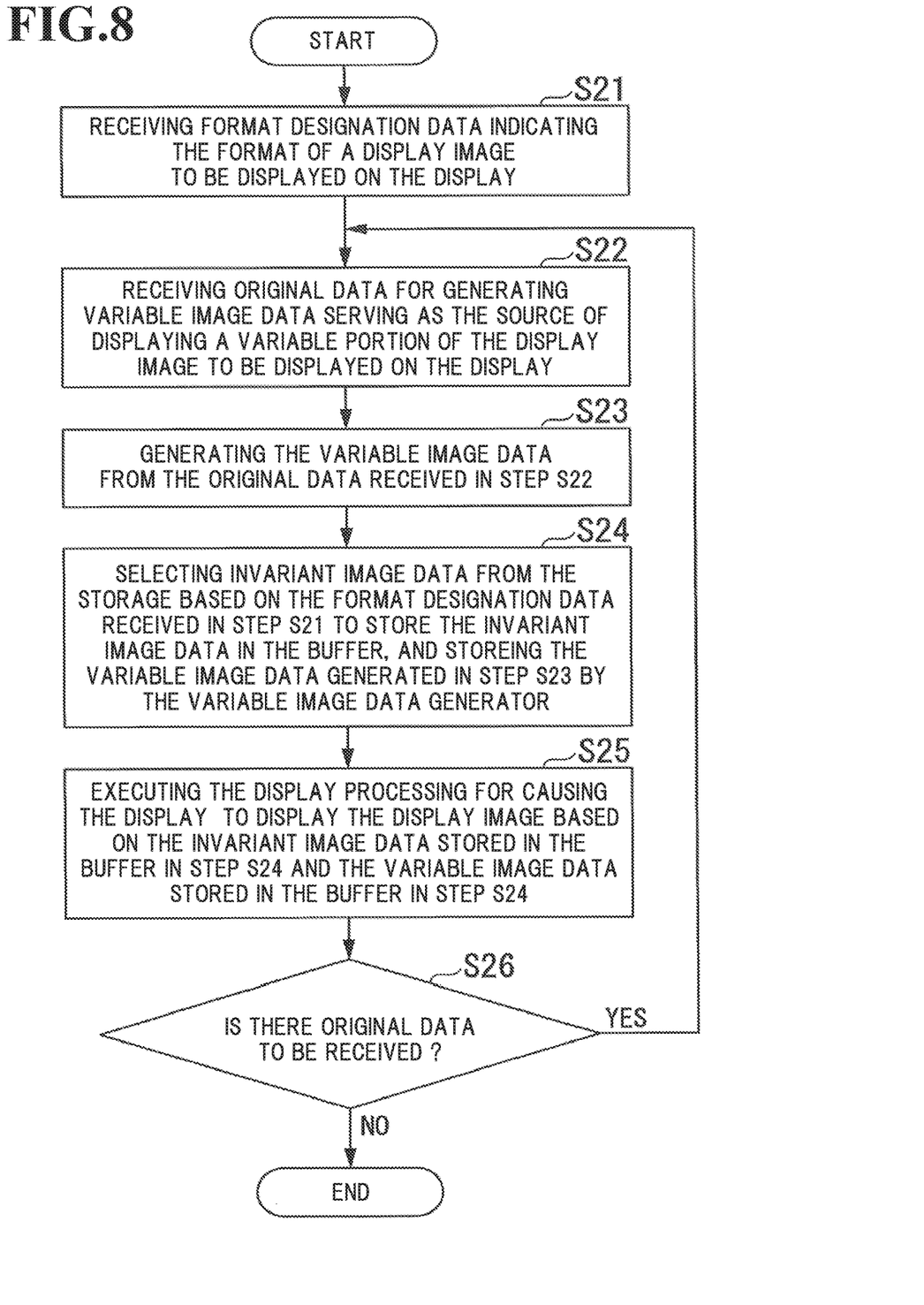
FIG. 8 is a flow chart for illustrating an example of processing to be executed by the display control device according to at least one embodiment of the present invention when checkout processing is executed.

Next, with reference to FIG. 8, a description is given of an example of processing to be executed by the display control device 30 when the checkout processing is executed. FIG. 8 is a flow chart for illustrating an example of processing to be executed by the display control device according to at least one embodiment of the present invention when the checkout processing is executed.

In Step S21, the data receiver 31 receives format designation data indicating the format of a display image to be displayed on the display 40.

In Step S22, the data receiver 31 receives original data for generating variable image data serving as the source of displaying a variable portion of the display image to be displayed on the display 40.

In Step S23, the variable image data generator 32 generates the variable image data from the original data received in Step S22.

In Step S24, the image data storage 34 selects invariant image data from the storage 33 based on the format designation data received in Step S21 to store the invariant image data in the buffer 35, and stores, in the buffer 35, the variable image data generated in Step S23 by the variable image data generator 32.

In Step S25, the display controller 36 executes the display processing for causing the display 40 to display the display image based on the invariant image data stored in the buffer 35 in Step S24 and the variable image data stored in the buffer 35 in Step S24.

In Step S26, the display controller 36 determines whether or not there is original data to be received. When determining that there is original data to be received ("YES" in Step S26), the display controller 36 returns the processing to Step S22, and when determining that there is no original data to be received ("NO" in Step S26), brings the processing to an end.

The display control device 30 according to at least one embodiment has been described above. The display control device 30 includes the storage 33 configured to store the invariant image data, the data receiver 31 configured to receive the original data for generating variable image data, the variable image data generator 32 configured to generate the variable image data from the original data, the image data storage 34 configured to select the invariant image data based on the format designation data to store the invariant image data in the buffer 35 and store the variable image data generated by the variable image data generator 32 in the buffer 35, and the display controller 36 configured to cause the display 40 to display the display image based on the invariant image data and the variable image data stored in the buffer 35. In addition, the original data includes at least one of the character code and the code data. The invariant image data includes at least one of the template image data and the predefined character image data. The variable image data includes at least one of the font image data and the code image data.

Therefore, to cause the display 40 to display the display image, the display control device 30 is only required to receive original data having a small data amount without being required to receive invariant image data having a large data amount from the terminal 10. This allows the display control device 30 to suppress the speed of communication for receiving data required for causing the display 40 to display the display image. In addition, the display control device 30 includes the storage 33 in which invariant image data is stored, and therefore allows the display 40 to display the display image without causing any problem. Therefore, the display control device 30 can also reduce the manufacturing cost while allowing the display 40 to display an image having a large data amount.

The buffer 35 also includes the first buffer 351 and the second buffer 352. That is, the display control device 30 includes an independent storage medium in which the invariant image data required to be updated relatively less frequently is stored and an independent storage medium in which the variable image data required to be updated relatively frequently is stored. This enables the display control device 30 to execute, at high speed, the display processing for generating a display image simply by compositing an image based on the invariant image data and an image based on the variable image data to cause the display 40 to display the display image.

The display control device 30 also generates variable image data each time original data is received, stores the variable image data in the buffer 35 each time the variable image data is generated, and executes the display processing each time the variable image data is stored in the buffer. With this processing, the display control device 30 can produce the above-mentioned effects even when the above-mentioned scroll display is executed.

The predefined character image is not limited to the predefined character image D1 illustrated in FIG. 3. In addition, the display image is not limited to the display image F11 illustrated in FIG. 5 and the display image F12 illustrated in FIG. 6. In view of this, with reference to FIG. 9 to FIG. 11, a description is given of another example of the predefined character image and another example of the display image.

Figure 9:
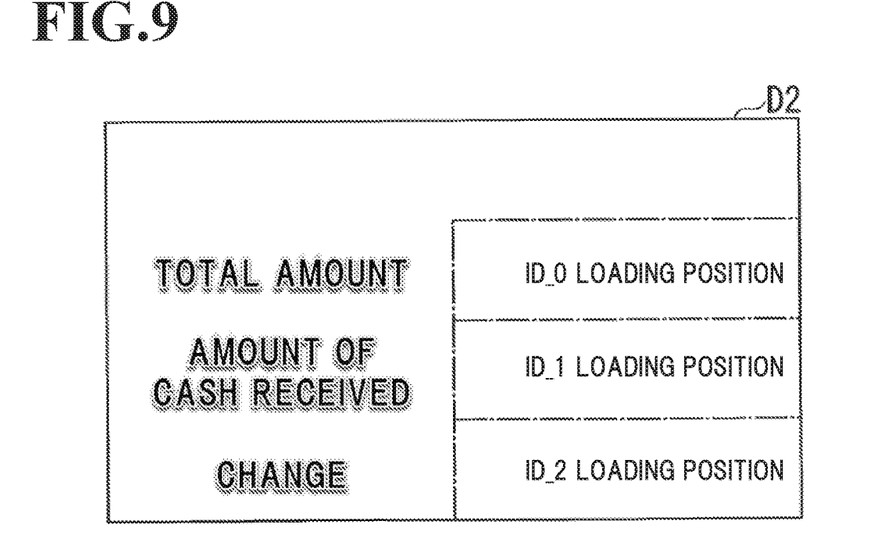
FIG. 9 is a diagram for illustrating an example of the predefined character image in at least one embodiment of the present invention.

FIG. 9 is a diagram for illustrating an example of the predefined character image in at least one embodiment of the present invention. A predefined character image D2 illustrated in FIG. 9 visualizes the character strings "TOTAL AMOUNT", "AMOUNT OF CASH RECEIVED", and "CHANGE" to be displayed while the bar codes of the products purchased by the customer are sequentially read during the checkout processing. In addition, "ID_0 LOADING POSITION", "ID_1 LOADING POSITION", and "ID_2 LOADING POSITION" are illustrated in the predefined character image D2. "ID_0 LOADING POSITION" illustrated in FIG. 9 indicates a position at which a total amount for specific checkout processing is to be displayed during the checkout processing. "ID_1 LOADING POSITION" illustrated in FIG. 9 indicates a position at which an amount received from the customer is to be displayed during the checkout processing. "ID_2 LOADING POSITION" illustrated in FIG. 9 indicates a position at which an amount of change to be given to the customer is to be displayed during the checkout processing.

Figure 10:
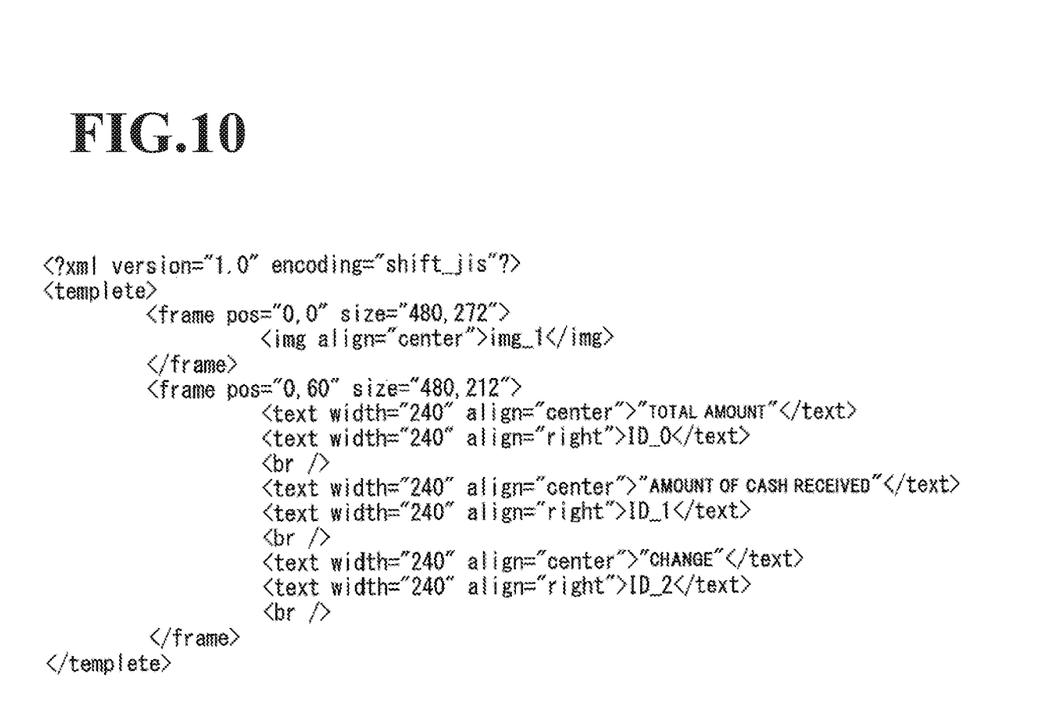
FIG. 10 is a diagram for illustrating an example of a case of using a markup language to define the layout of the predefined character image illustrated in FIG. 9.

FIG. 10 is a diagram for illustrating an example of a case of using a markup language to define the layout of the predefined character image illustrated in FIG. 9.

The layout of the character string "TOTAL AMOUNT" illustrated in FIG. 9 is defined by the character string "<text width="240" align="center">"TOTAL AMOUNT"</text>" on the seventh line from the top of FIG. 10. This character string defines that a field for displaying the character string "TOTAL AMOUNT" has a horizontal width of 240, and that the character string "TOTAL AMOUNT" is displayed at the horizontal center of the field.

The layout of the character string "AMOUNT OF CASH RECEIVED" illustrated in FIG. 9 is defined by the character string "<text width="240" align="center">"AMOUNT OF CASH RECEIVED"</text>" on the tenth line from the top of FIG. 10. This character string defines that a field for displaying the character string "AMOUNT OF CASH RECEIVED" has a horizontal width of 240, and that the character string "AMOUNT OF CASH RECEIVED" is displayed at the horizontal center of the field.

The layout of the character string "CHANGE" illustrated in FIG. 9 is defined by the character string "<text width="240" align="center">"CHANGE"</text>" on the thirteenth line from the top of FIG. 10. This character string defines that a field for displaying the character string "CHANGE" has a horizontal width of 240, and that the character string "CHANGE" is displayed at the horizontal center of the field.

The layout of "ID_0 LOADING POSITION" illustrated in FIG. 9 is defined by the character string "<text width="240" align="right">ID_0</text>" on the eighth line from the top of FIG. 10. This character string defines that a field for displaying the total amount to be displayed at "ID_0 LOADING POSITION" has a horizontal width of 240, and that the total amount is displayed right-aligned.

The layout of "ID_1 LOADING POSITION" illustrated in FIG. 9 is defined by the character string "<text width="240" align="right">ID_1</text>" on the eleventh line from the top of FIG. 10. This character string defines that a field for displaying the amount of cash received from a customer to be displayed at "ID_1 LOADING POSITION" has a horizontal width of 240, and that the amount is displayed right-aligned.

The layout of "ID_2 LOADING POSITION" illustrated in FIG. 9 is defined by the character string "<text width="240" align="right">ID_2</text>" on the fourteenth line from the top of FIG. 10. This character string defines that a field for displaying the amount of change to be displayed at "ID_2 LOADING POSITION" has a horizontal width of 240, and that the amount is displayed right-aligned.

Figure 11:
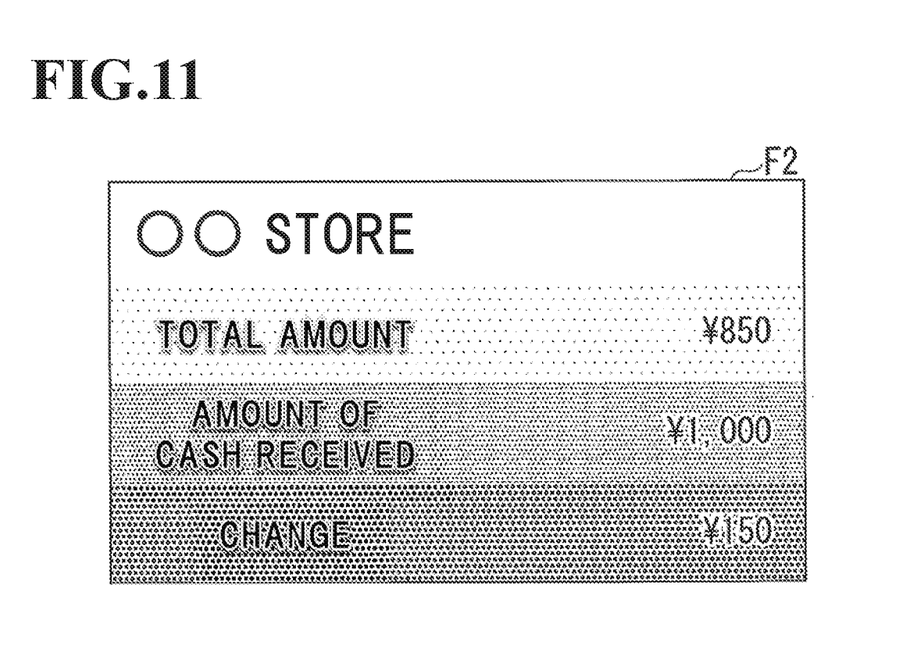
FIG. 11 is a diagram for illustrating an example of the display image in at least one embodiment of the present invention.

FIG. 11 is a diagram for illustrating an example of the display image in at least one embodiment of the present invention. The display controller 36 causes the display 40 to display the display image F2 illustrated in FIG. 11 through use of the predefined character image D2 illustrated in FIG. 9 and the template image T illustrated in FIG. 2. As illustrated in FIG. 11, the display image F2 visualizes the characters "∞ STORE", the characters "TOTAL AMOUNT", the characters "¥850" indicating the total amount, the characters "AMOUNT OF CASH RECEIVED", the characters "¥1,000" indicating the amount of cash received from the customer, the characters "CHANGE", and the characters "¥150" indicating the amount of change.

All or a part of the functions of the display control device 30 described above may be recorded as a program on a computer-readable recording medium, and this program may be executed by a computer system. The computer system includes an OS and a peripheral device and other such hardware. Examples of the computer-readable recording medium include a flexible disk, a magneto-optical disk, a read only memory (ROM), a CD-ROM, and other such portable medium, a hard disk built into the computer system and other such storage device, and a volatile memory (random access memory (RAM)) provided by a server on the Internet or other such network. The volatile memory is an example of a recording medium configured to hold a program for a fixed period of time.

In addition, the above-mentioned program may be transmitted to another computer system through a transmission medium, for example, the Internet or other such network or a telephone line or other such communication line.

The above-mentioned program may also be a program for implementing all or a part of the above-mentioned functions. The program for implementing a part of the above-mentioned functions may be a so-called differential program capable of implementing the above-mentioned functions in combination with a program recorded in advance in the computer system.

At least one embodiment for carrying out the present invention has been described with reference to the accompanying drawings, but the present invention is not limited to the above-mentioned embodiment. That is, any component of the present invention can be deleted, modified, or replaced without departing from the gist of the present invention.

What is claimed is:

1. A display control device, comprising:
   a storage configured to store invariant image data serving as a source of displaying an invariant portion of a display image to be displayed on a display;
   a data receiver configured to receive format designation data for designating a format of the display image and original data for generating variable image data serving as a source of displaying a variable portion of the display image;
   a variable image data generator configured to generate the variable image data from the original data;
   a buffer configured to store the invariant image data and the variable image data;
   an image data storage configured to select the invariant image data from the storage based on the format designation data to store the invariant image data in the buffer, and store, in the buffer, the variable image data generated by the variable image data generator; and
   a display controller configured to execute display processing for causing the display to display the display image based on the invariant image data stored in the buffer and the variable image data stored in the buffer.

2. The display control device according to claim 1, wherein the buffer includes a first buffer configured to store the invariant image data and a second buffer configured to store the variable image data.

3. The display control device according to claim 2,
   wherein the variable image data generator is configured to generate the variable image data each time the data receiver receives the original data,
   wherein the image data storage is configured to store the variable image data in the buffer each time the variable image data generator generates the variable image data, and
   wherein the display controller is configured to execute the display processing each time the image data storage stores the variable image data in the buffer.

4. The display control device according to claim 3,
wherein the original data includes at least one of a character code and code data,
wherein the invariant image data includes at least one of template image data and predefined character image data, and
wherein the variable image data includes at least one of font image data and code image data.

5. The display control device according to claim 4, wherein the data receiver is configured to receive the original data transmitted through a printing apparatus.

6. The display control device according to claim 1,
wherein the variable image data generator is configured to generate the variable image data each time the data receiver receives the original data,
wherein the image data storage is configured to store the variable image data in the buffer each time the variable image data generator generates the variable image data, and
wherein the display controller is configured to execute the display processing each time the image data storage stores the variable image data in the buffer.

7. The display control device according to claim 1,
wherein the original data includes at least one of a character code and code data,
wherein the invariant image data includes at least one of template image data and predefined character image data, and
wherein the variable image data includes at least one of font image data and code image data.

8. The display control device according to claim 1, wherein the data receiver is configured to receive the original data transmitted through a printing apparatus.

9. A display control method, comprising:
receiving format designation data for designating a format of a display image to be displayed on a display and original data for generating variable image data serving as a source of displaying a variable portion of the display image;
generating the variable image data from the original data;
an image data storing step of selecting invariant image data, which is stored in a storage and serves as a source of displaying an invariant portion of the display image, to store the invariant image data in a buffer, and storing, in the buffer, the variable image data generated in the generating of the variable image data; and
a display control step of executing display processing for causing the display to display the display image based on the invariant image data stored in the buffer and the variable image data stored in the buffer.

* * * * *